United States Patent [19]

Lubreski et al.

[11] Patent Number: 5,139,381
[45] Date of Patent: Aug. 18, 1992

[54] SLIDE-FIT NUT

[75] Inventors: Walter A. Lubreski, West Hills; David Bettger, Torrance; John J. Carroll, Valencis, all of Calif.

[73] Assignee: Cinch Incorporated, Wilmington, Del.

[21] Appl. No.: 822,676

[22] Filed: Jan. 21, 1992

[51] Int. Cl.⁵ .................... F16B 39/36; F16B 37/08
[52] U.S. Cl. .................................... 411/433; 411/267
[58] Field of Search ............... 411/266, 267, 270, 433

[56] References Cited

U.S. PATENT DOCUMENTS

| | | |
|---|---|---|
| 242,074 | 5/1881 | Theobald . |
| 892,972 | 7/1908 | Bryce . |
| 894,875 | 8/1908 | Bryce . |
| 1,293,180 | 2/1919 | Pace . |
| 1,956,473 | 4/1934 | Perry . |
| 2,576,579 | 11/1951 | Donovan . |
| 2,814,324 | 11/1957 | Shur . |
| 2,814,325 | 11/1957 | Shur . |
| 3,151,652 | 10/1964 | Zahodiakin . |
| 3,151,653 | 10/1964 | Zahodiakin . |
| 3,157,215 | 11/1964 | Zahodiankin . |
| 3,160,187 | 12/1964 | Zahodiakin . |
| 3,868,082 | 2/1975 | Soderqvist . |
| 4,083,393 | 4/1978 | Okada . |
| 4,378,187 | 3/1983 | Fullerton . |
| 4,930,961 | 6/1990 | Weis .................... 411/266 |

Primary Examiner—Neill R. Wilson
Attorney, Agent, or Firm—Kelly Bauersfeld & Lowry

[57] ABSTRACT

An improved slide-fit nut is provided for rapid push-on mounting to a substantially seated position on a threaded bolt or the like. The slide-fit nut includes a plurality of threaded nut segments carried within a nut housing and adapted for radial expansion to accommodate push-on mounting onto a threaded bolt. A cap plate on the nut housing includes cam members for retaining the nut segments in threaded engagement with the bolt upon rotation of the nut in a tightening direction. When the nut is rotated in an opposite direction, the cam members displace the nut segments in a radially outward direction relative to the bolt, resulting in substantial disengagement of the nut segments to permit rapid pull-off removal of the nut from the bolt.

11 Claims, 3 Drawing Sheets

FIG. 1
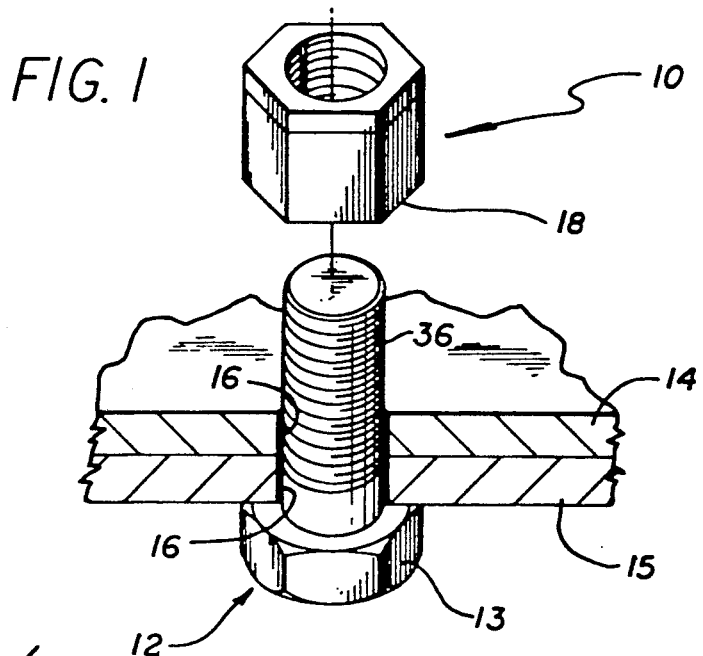
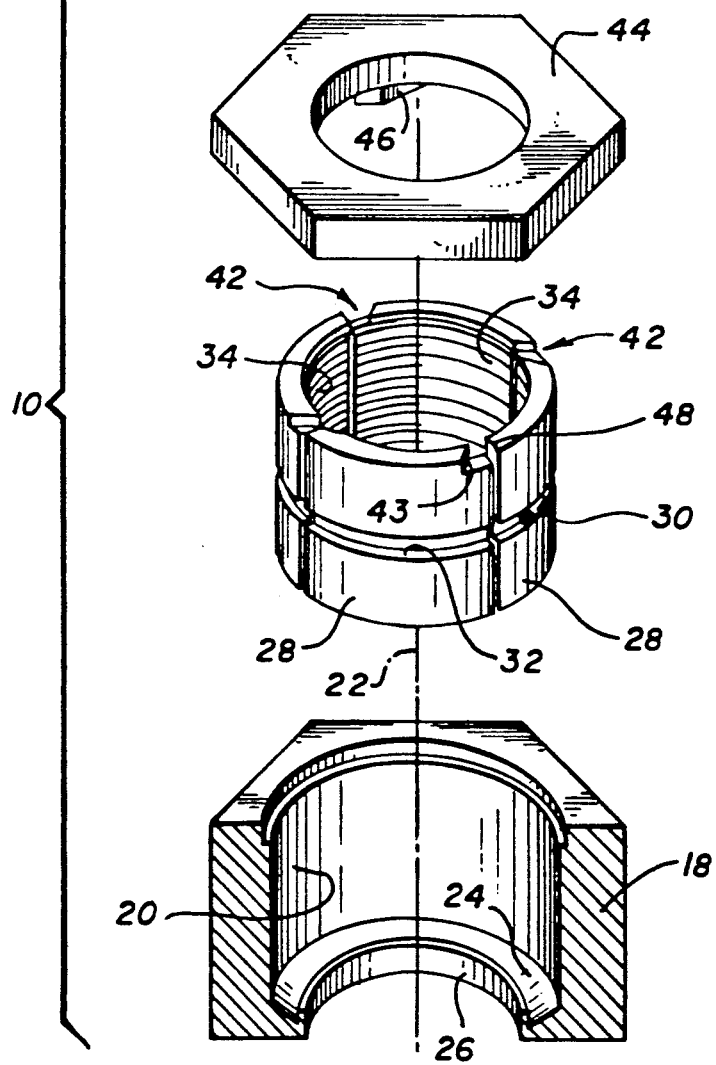
FIG. 2 ns against radially
SLIDE-FIT NUT

BACKGROUND OF THE INVENTION

This invention relates generally to improvements in slide-fit nuts of the type adapted for rapid axial push-on mounting onto a threaded bolt or the like. More particularly, this invention relates to an improved slide-fit nut designed for bidirectional axial sliding movement with respect to an associated threaded bolt, thereby permitting rapid push-on mounting and rapid pull-off removal of the nut.

Slide-fit nuts, sometimes referred to as jam nuts, are generally known in the art for rapid push-on mounting onto a threaded bolt, stud or similar threaded structure, wherein the nut is installed onto the bolt to a seated or nearly seated position with little or no rotational motion. Such slide-fit nuts are typically constructed to include a plurality of part-cylindrical, longitudinally separated nut segments which are mounted in a cylindrical array within an outer nut casing or housing. The nut segments are internally threaded to collectively define a spiral female thread for engaging a mating thread on an associated bolt. One or more springs are wrapped about the nut segments to apply a radially inward force urging the nut segments into normal threaded engagement with the bolt. However, cam surfaces acting between the outer nut casing and the inner nut segments permit the nut segments to displace radially outwardly when the nut is pushed in one axial direction over the associated bolt. Accordingly, the slide-fit nut can be displaced rapidly over the axial length of the bolt, with a non-rotational push-on action, to a seated position in axial abutment with a substrate. If further tightening of the nut is desired, a small amount of nut rotation can be accomplished by engaging the nut casing with a wrench or the like. For an example of a push-on nut of this general type, see U.S. Pat. No. 4,378,187.

While push-on nuts beneficially permit rapid nut mounting without requiring substantial nut rotation over the protruding free length of a bolt, such nuts available in the art have not permitted a similarly rapid pull-off removal from the bolt when disassembly is desired. Instead, it has been necessary to back-rotate the nut from the seated position, with such back-rotation continuing for the entire free length of the bolt until the nut is removed. In some applications, this requirement for rotational nut displacement for removal purposes can be undesirably time consuming and tedious.

There exists, therefore, a significant need for an improved slide-fit nut which can be mounted onto a bolt quickly and easily with a simple push-on action, and which is also adapted for rapid removal from the bolt with a simple pull-off action. The present invention fulfills these needs and provides further related advantages.

SUMMARY OF THE INVENTION

In accordance with the invention, an improved slide-fit nut is provided for rapid and easy axial push-on mounting onto and axial pull-off removal from a threaded bolt or the like. The nut comprises an array of threaded nut segments carried within a nut housing and associated with spring means for urging the nut segments radially inwardly for normal threaded engagement with the bolt. A cap plate on the nut housing includes cam members engageable with the nut segments for locking the nut segments against radially outward displacement upon rotation of the nut in one direction. However, the cam members are oriented to engage and displace the nut segments in a radially outward direction upon nut rotation in an opposite direction. Accordingly, rotation of the slide-fit nut in one direction is effective to tighten the nut on the bolt, whereas nut rotation in an opposite direction effectively releases the nut segments from the bolt.

In use, in a preferred embodiment, the nut segments within the nut housing are carried for radially outward displacement to override the threads on the bolt with a ratchet-like action as the nut is translated axially, substantially without rotation, over the bolt with a push-on or pull-off action. When the slide-fit nut is installed, the nut is pushed axially to a substantially seated position in axial abutment with a substrate, and then rotated through a short stroke in a first direction to securely tighten the nut. During such tightening rotation, the cam members retain the nut segments against radially outward displacement. Subsequent back-rotation of the nut through a short stroke in an opposite or second direction is effective to engage the nut segments with the cam members to displace the nut segments radially outwardly to a position substantially disengaged from the bolt. The thus untightened nut can then be removed from the bolt with a rapid pull-off action.

Other features and advantages of the present invention will become more apparent from the following detailed description, taken in conjunction with the accompanying drawings which illustrate, by way of example, the principles of the invention

BRIEF DESCRIPTION OF THE DRAWINGS

The accompanying drawings illustrate the invention. In such drawings:

FIG. 1 is an exploded perspective view, partially in vertical section, depicting a removable slide-fit nut embodying the novel features of the invention, and adapted for push-on mounting onto a threaded bolt or the like;

FIG. 2 is enlarged exploded perspective view of the slide-fit nut of FIG. 1, with a portion thereof shown in vertical section;

DETAILED DESCRIPTION OF THE PREFERRED EMBODIMENT

Figure 3:
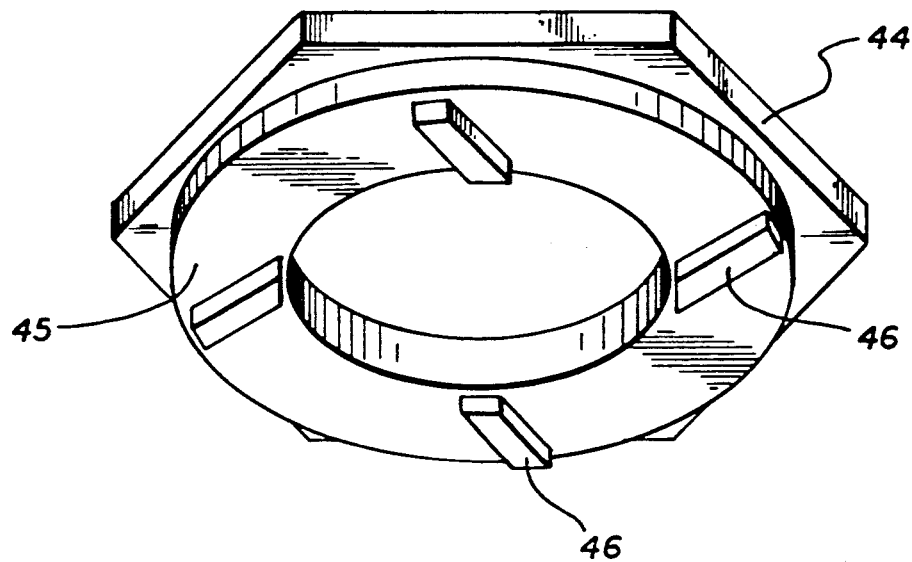
FIG. 3 is an enlarged bottom perspective view of a cap plate for the nut, having a plurality of angularly set cam members thereon.

As shown in the exemplary drawings, an improved slide-fit nut referred to generally in FIG. 1 by the reference numeral 10 is provided for push-on mounting onto a threaded bolt 12 or the like. The slide-fit nut 10 is designed to slide axially onto the bolt 12 to a seated or substantially seated position in axially abutting relation with a substrate, followed by a small amount of rotational displacement to securely tighten the nut. In addition, the nut 12 is adapted for removal from the bolt 12 by a small amount of back-rotation to release or untighten the nut followed by axial pull-off motion.

FIG. 1 illustrates the slide-fit nut 10 with a generally conventional nut configuration for threaded engagement with a fastener such as the bolt 12 passed through aligned openings 16 in one or more substrates such as plates 14 and 15. However, it will be understood that the invention has utility in connection with a wide variety of threaded fastener configurations and environments of use. For convenience of description and ease of illustration, FIG. 1 depicts a free end of the bolt 12 projecting upwardly from the substrate 14, such that secure fastening of the slide-fit nut 10 onto the bolt free end in abutting relation with the substrate 14 will function to tightly clamp the plates 14 and 15 between the nut 10 and a bolt head 13.

As shown in more detail in FIG. 2, the slide-fit nut 10 comprises an outer nut housing 18 depicted to include an hexagonal external geometry for convenient engagement with a standard wrench (not shown). The interior of the nut housing defines a generally cylindrical, smooth surfaced bore 20 extending along a major portion of a longitudinal housing axis 22. A leading edge of the bore 20 terminates at an annular inclined cam surface 24 which extends radially inwardly and in an axially forward direction, terminating in turn at a retainer rim 26 extending rearwardly a short distance.

A plurality of nut segments 28 are mounted within the bore 20 of the nut housing 18, with four of said nut segments 28 being shown in the illustrative embodiment. These nut segments 28 each have an arcuate part-cylindrical shape and are arranged in a longitudinally split, generally cylindrical array. A spring ring 30 such as an elastic band or the like is carried within an external groove 32 defined collectively by the nut segments to retain the nut segments in a radially compressed cylindrical array. Female thread segments 34 are formed on the radially inner surfaces of the nut segments 28 to define a spiral female thread adapted to engage the male thread 36 on the bolt 12. Importantly, when the nut segments are radially compressed with their adjacent side edges in abutting or substantially abutting relation, the resultant female thread has a diametric size for threaded locking onto the bolt.

Figure 6:
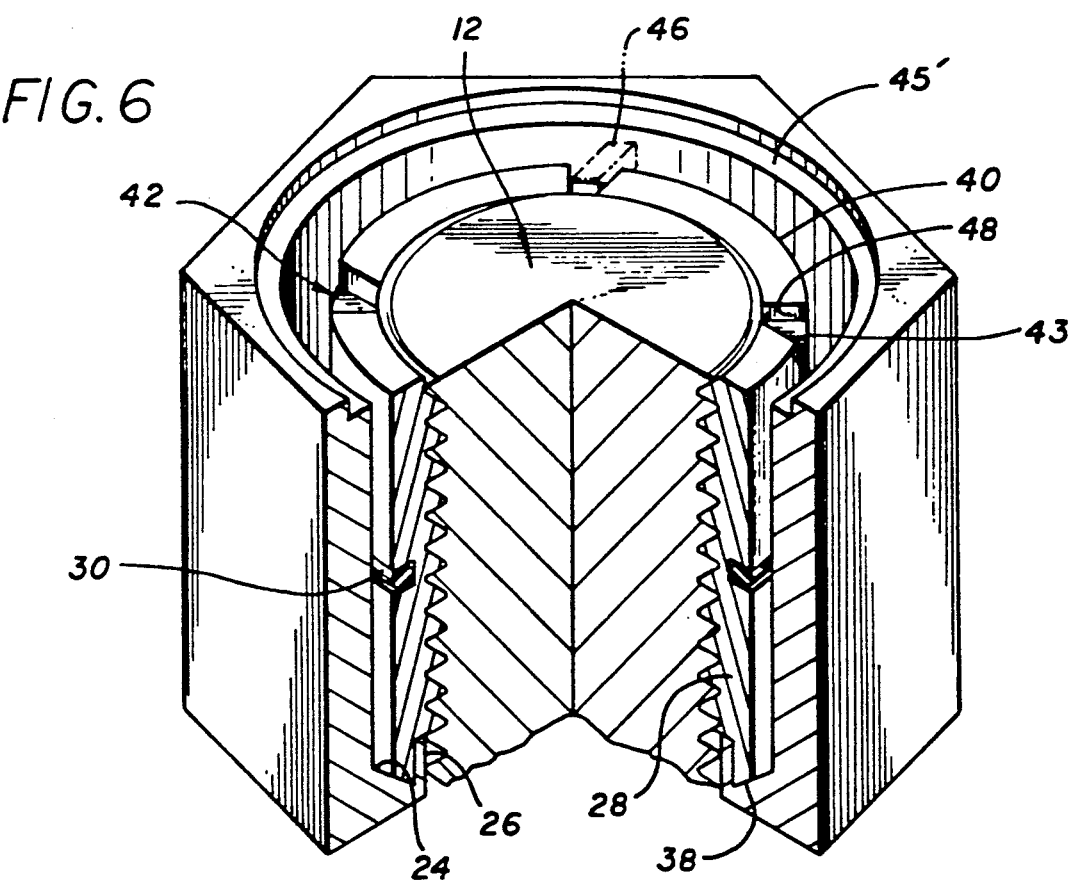
FIG. 6 is a fragmented perspective view showing the slide-fit nut installed onto the bolt, with portions of the nut broken away and/or removed to illustrate operation thereof.
Figure 4:
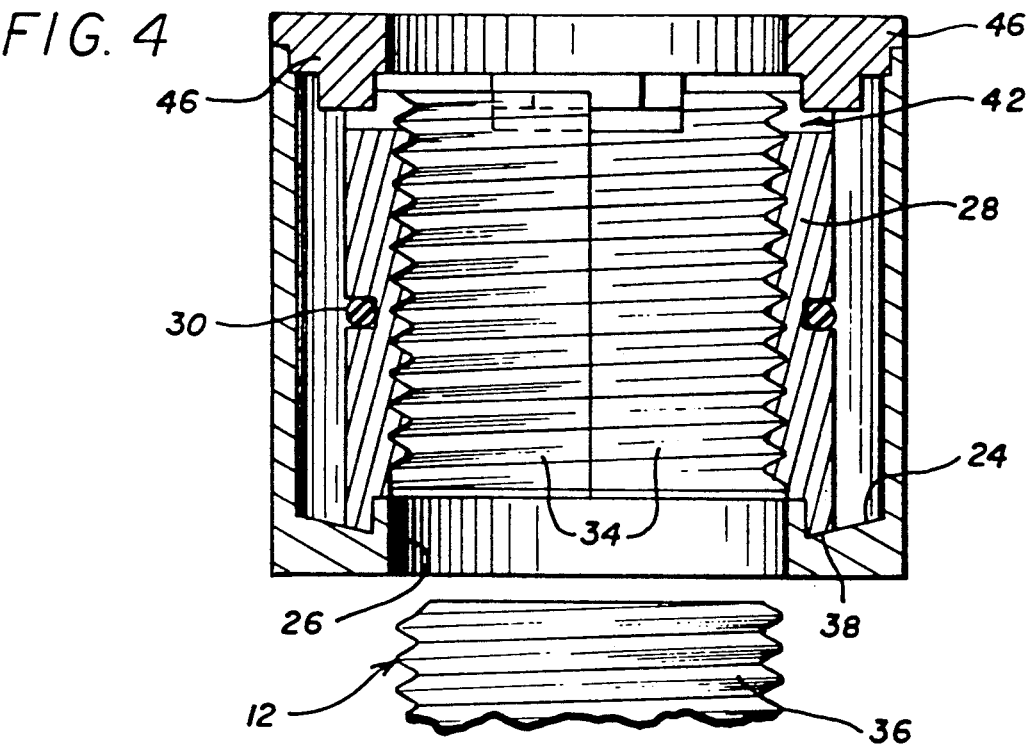
FIG. 4 is a fragmented vertical sectional view of the slide-fit nut oriented in a position for push-on mounting onto a bolt.
Figure 5:
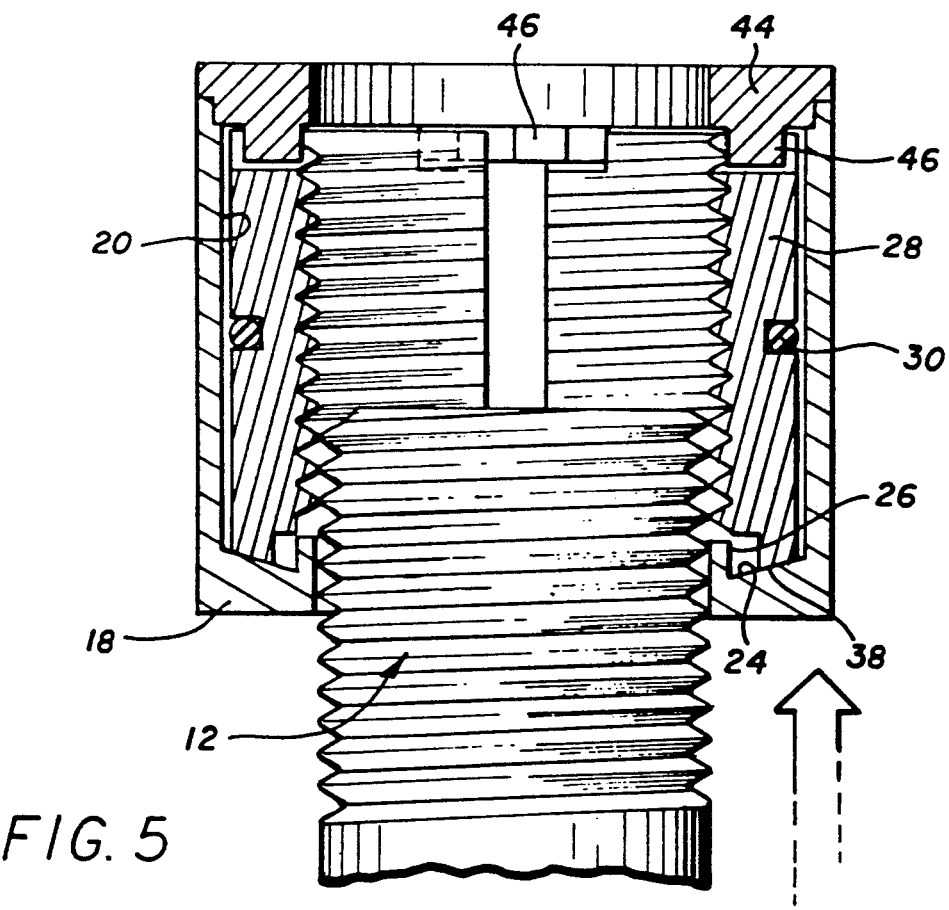
FIG. 5 is a fragmented vertical sectional view similar to FIG. 4, and depicting the nut installed partially onto the bolt.

As shown in FIGS. 4-6, the nut segments 28 are formed to include leading end faces 38 set angularly for mating engagement with the inclined cam surface 24 at the leading end of the nut housing 18. FIG. 4 depicts the nut segments 28 in engagement with the nut housing cam surface 24, and the spring 30 acting to compress the nut segments radially inwardly for contact with the retainer rim 26.

A trailing edge 40 of each nut segment includes a recessed notch defining an angularly set cam track 42. In the preferred embodiment, as shown in FIGS. 2 and 6, this cam track 42 for each nut segment can be formed at a trailing edge corner to define an angled cam face 43 set at an angle of about forty five degrees to a radius of the assembled nut segments. For a standard right-hand thread as will be described in more detail, the cam face 43 is set to urge the nut segments 28 in a radially inward direction, and thus to prevent radial expansion of the nut segments, when the slide-fit nut 10 is rotated in a clockwise direction for advance motion onto the bolt 12.

An annular cap plate 44 is mounted onto the nut housing 28 at a trailing edge thereof. In the preferred form, the cap plate includes an annular disk 45 at the underside thereof (FIG. 3) for attachment to the nut housing 28 as by press-fit into a shallow annular groove 45' formed in the trailing end thereof (FIG. 6). Alternately, other connection means for attaching the cap plate and nut housing may be used, such as set screws, welds, etc. In general terms, the cap plate 44 functions to axially retain the nut segments 28 within the nut housing. In addition, the cap plate 44 carries a plurality of raised cam members 46 which seat within the cam tracks 42 and function to permit rapid tightening or release of the slide-fit nut.

More particularly, as shown in FIG. 3, the cam members 46 comprise a plurality of angularly set rails formed at the underside of the cap plate 44. These cam members are shown angularly set at approximately forty five degrees to a radius of the nut, although other angular orientations may be used. Importantly, the cam members 46 are adapted for matingly engaging the angled cam faces 43 of the cam tracks 42.

With reference to FIGS. 4 and 5, the slide-fit nut 10 can be installed onto the bolt 12 quickly and easily by an axial push-on relative motion, with little or no corresponding rotation between the nut and the bolt. As the thread 36 on the bolt 12 engages the female thread defined by the nut segments 28, the engaging inclined thread surfaces accommodate radial expansion of the nut segments (FIG. 5). That is, the nut segments 28 are displaced radially outwardly and along the inclined cam surface 24 to permit push-on reception of the bolt, with the female thread overriding the male thread with a ratchet-like action. When the nut 10 is substantially seated against the substrate 14 (FIG. 1), the spring 30 urges the nut segments 28 toward the radially compressed position. A small amount of nut rotation, typically less than one full revolution, is then effective to fully seat and tighten the nut segments with the bolt. For a right-hand thread as shown in the drawings, this tightening rotation is in a clockwise direction advancing the nut onto the bolt, with the cam members 46 bearing firmly against the angled cam faces 43 of the nut segments to force and retain the nut segments in a radially inward direction. The radially inward locking action applied to the nut segments is enhanced by the inclined cam surface 24.

Opposite or back-rotation of the tightened nut, in a counter-clockwise direction for a right-hand thread, causes the angled cam members 46 to bear against the side edge 48 of the adjacent nut segment opposite to the cam face 43. As shown in FIGS. 2 and 6, these side edges 48 may conveniently be set on a radius of the nut, although angular orientation in parallel with the associated cam face 43 may be used if desired. In any event, the cam members 46 bear against the nut segments to urge the nut segments toward a radially expanded position disengaged from the bolt thread. Such disengagement occurs easily upon back-rotation of the nut typically through a portion of one revolution. As soon as the nut is disengaged and/or untightened, the nut 10 can be pulled axially from the bolt with the nut segments springably overriding the bolt thread. Pull-off movement is relatively easy when the angle of the cam surface 24 on the nut housing is substantially less than the angle of the bolt thread faces, with an inclination angle on the order of about ten to twenty degrees accommodating relatively easy pull-off motion relative to standard bolt threads. However, the inclination angle of the cam surface 24 can be increased sufficiently to obstruct or prevent pull-off motion, if desired. In this regard, increasing the inclination angle of the cam surface 24 increases the radial inward lock assistance when the nut is tightened, with corresponding increased resistance to sliding pull-off of the nut from the bolt. For a standard bolt thread configuration, an inclination angle of less than twenty degrees relative to the central nut axis 22 will permit slide-off movement, whereas an inclination angle greater than twenty degrees will prevent slide-off movement.

Accordingly, the slide-fit nut 10 provides an improved apparatus for rapid push-on installation and, if desired, rapid pull-off removal with respect to a bolt or the like. The angled cam members engage the nut segments for tightening action in response to nut rotation in one direction, and for bolt release in response to nut back-rotation.

A variety of modifications and improvements to the slide-fit nut of the present invention will be apparent to those persons skilled in the art. Accordingly, no limitation on the invention is intended by way of the foregoing description and accompanying drawings, except as set forth in the appended claims.

What is claimed is:

1. A slide-fit nut for push-on mounting onto a threaded bolt, said nut comprising:

nut housing means defining an open axial bore for reception of a bolt; and a plurality of part-cylindrical nut segments mounted within said nut housing means in a generally cylindrical array and cooperatively defining a female thread for threaded engagement with a bolt received through said axial bore, said nut segments being radially movable between a compressed position for threaded engagement with the bolt and a radially expanded position substantially disengaged from the bolt;

said nut housing means and said nut segments including interengageable cam means for moving said nut segments toward said radially compressed position upon rotation of said nut housing means on the bolt in one direction, and for moving said nut segments toward said radially expanded position upon rotation of said nut housing means on the bolt in an opposite direction.

2. The slide-fit nut of claim 1 further including spring means for urging said nut segments normally toward said radially compressed position.

3. The slide-fit nut of claim 1 wherein said nut housing means comprises a nut housing having said bore formed therein and including means at one end thereof for axially retaining said nut segments, and an annular cap plate mounted at an opposite end of said nut housing for axially retaining said nut segments within said nut housing.

4. The slide-fit nut of claim 3 wherein said cam means comprises angularly set cam tracks formed on said nut segments, and angularly set cam members on said cap plate and disposed within said cam tracks.

5. The slide-fit nut of claim 2 wherein said spring means comprises a spring ring mounted about said nut segments.

6. The slide-fit nut of claim 4 wherein each of said cam tracks is defined by a recessed notch having a pair of opposed cam faces formed respectively on an adjacent pair of said nut segments.

7. The slide-fit nut of claim 3 wherein said means for axially retaining said nut segments at said one end of said housing comprises an inclined annular cam surface extending radially inwardly and axially forwardly on said nut housing, said cam surface terminating at a radially inner end in an axially rearwardly projecting retainer rim.

8. The slide-fit nut of claim 7 wherein said nut segments each include an axially leading end face set angularly for mating engagement with said cam surface.

9. The slide-fit nut of claim 7 wherein said cam surface is angularly inclined at an angle of less than about twenty degrees relative to a central axis of the nut to permit pull-off removal of the nut from the bolt.

10. The slide-fit nut of claim 9 wherein said cam surface is formed at an inclination angle of about ten to twenty degrees.

11. The slide-fit nut of claim 7 wherein said cam surface is angularly inclined at an angle of greater than about twenty degrees relative to a central axis of the nut to prevent pull-off removal of the nut from the bolt.

* * * * *